United States Patent [19]

Beasley

[11] Patent Number: 4,797,861
[45] Date of Patent: Jan. 10, 1989

[54] METHOD OF PROCESSING SEISMIC DATA

[75] Inventor: Craig J. Beasley, Houston, Tex.

[73] Assignee: Western Atlas International, Inc., Houston, Tex.

[21] Appl. No.: 175,274

[22] Filed: Mar. 30, 1988

Related U.S. Application Data

[63] Continuation-in-part of Ser. No. 779,176, Nov. 16, 1985, Pat. No. 4,742,497.

[51] Int. Cl.⁴ .............................................. G01V 1/04
[52] U.S. Cl. .......................................... 367/50; 367/52
[58] Field of Search ................. 364/421, 422; 367/37, 367/38, 39, 40, 41, 42, 43, 45, 47, 50, 52, 53, 59, 62, 63, 68, 72

[56] References Cited

U.S. PATENT DOCUMENTS

| | | | |
|---|---|---|---|
| 2,732,906 | 1/1956 | Mayne | 181/0.5 |
| 3,217,828 | 11/1965 | Mendenhall | 181/0.5 |
| 4,241,429 | 12/1980 | Bloomquist et al. | 367/52 |
| 4,330,873 | 5/1982 | Peterson | 367/60 |
| 4,403,312 | 9/1983 | Thomason | 367/56 |
| 4,742,497 | 5/1988 | Beasley et al. | 367/52 |

OTHER PUBLICATIONS

Beasley et al., 1984, A Comprehensive Solution to Problems in the Processing of 3-D Data, Western Geophysical, 1984, pp. 1-6.
Levin, F. K., Apparent Velocity from Dipping Interface Reflections, *Geophysics*, vol. 36, No. 3, Jun. 1971, pp. 510-516.
Hale, I. D., 1983, Dip-Moveout by Fourier Transform, Doctoral Thesis, Stanford University, pp. 67-71.

*Primary Examiner*—Brian S. Steinberger
*Attorney, Agent, or Firm*—Barry C. Kane

[57] ABSTRACT

A computationally-economical method for converting a set of aerially-distributed seismic traces into a new, clearly-resolved, three-dimensional display of a volume of the earth without use of dip-dependent or azimuth-dependent migration velocities.

4 Claims, 3 Drawing Sheets

METHOD OF PROCESSING SEISMIC DATA

REFERENCE TO RELATED APPLICATIONS

This invention is a continuation-in-part of copending U.S. patent application No. 06/779/176, filed 11-16-1985, now U.S. Pat. No. 4,742,497 assigned to the assignee of this invention.

BACKGROUND OF THE INVENTION

This invention is concerned with an improved method for transforming a set of spatially-distributed non-zero-offset seismic traces into a new set of dip-resolved, zero-offset, unmigrated output seismic traces representative of the three-dimensional (3-D) configuration of a volume of the earth.

Common Mid Point (CMP) stacking, also sometimes referred to as Common Depth Point or Common Reflection Point, CDP or CRP respectively) of seismic field data is well known. See for example U.S. Pat. Nos. 3,217,828 to Mendenhall et al, and 2,732,906 to Mayne, which are incorporated herein by reference as a teaching of the CMP technique. The U.S. Pat. No. 3,217,828 teaches two-dimensional (2-D) data processing where dipping earth layers are projected into a two-dimensional plane, perpendicular to the surface of the earth, along a designated line of profile.

The earth is three-dimensional. It is the configuration of a volume of the earth that is of interest for mapping three-dimensional structures likely to contain valuable mineral resources. In 2-D processing, only the dip component parallel to the line of survey is mapped. Earth-layer dip components lying outside the 2-D plane are distorted.

The limitations of conventional 2-D calculations are three-fold: First, for a dipping reflector, the true reflecting point for a reflection at a non-zero offset lies up-dip from the midpoint between a seismic source and a receiver of seismic signals. When the data from different offsets are stacked, reflection-point smear occurs.

Second, stacking velocities are dip-dependent and hence when events with differing dips cross on a processed seismic section, no single velocity function will properly align the different events on the CMP gather at that location. That situation causes conventional stacking to mid-stack the events for which the chosen velocity was inappropriate.

Third, the stacking velocities are azimuth-dependent. That is, the stacking velocity depends on the orientation of the direction of maximum dip with respect to the vertical plane between the seismic source and the receiver.

Because 2-D exploration is confined to single lines of profile, 3-D resolution of the details of a volume of the earth based upon 2-D is often somewhat distorted.

3-D areal coverage often takes the form of a grid of seismic lines consisting essentially of two sets of lines orthogonally arranged with respect to one another. Each line includes a plurality of seismic-signal receivers interspersed with a plurality of seismic sources that are placed at desired locations within the grid. The grid may, however, be rectangular, circular, hexagonal, star-shaped or any other desired geometrical pattern. The grid of sources and receivers is customarily placed horizontally over the surface of the earth but conceptually at least, there is no reason why vertical arrays should be excluded. With suitable equipment adaptations, 3-D operations may be carried out on land or at sea.

Within a reasonable radius of about two miles or so, the firing of any one source will isonify an entire array of seismic sensors or receivers in a large area. Accordingly, any source-receiver pair, or combination thereof, along any desired azimuth therebetween, may be designated as a "line of profile".

The area of survey may be divided into cells of suitable geometrical shape such as a rectangle. The cell of dimensions depend upon the ultimate resolution desired but dimensions such as 25 by 50 meters or less are not uncommon. In processing, for any given source-receiver pair, there may be designated a midpoint; the midpoint is assigned to an appropriate cell for mapping and other purposes.

U.S. Pat. Nos. 4,241,429; 4,330,873; and 4,403,312 are typical of prior-art 3-D seismic exploration arrays. F. K. Levin in "Apparent Velocity from Dipping Interface Reflections," *Geophysics*, 1971, pp. 510–516, discusses the dependence of the medium velocity on dip and azimuth.

Ordinarily, the geophysicist has no prior knowledge of local dip or azimuth of a line of profile with respect to the direction of maximum dip. There is therefore always the problem of selection of the prior migration velocity function for dip migration. Yet that problem is of key interest when steep dips, substantially greater than about 10 degrees, are present. As Levin pointed out, and as will be discussed later, if the migration velocity is not corrected for both dip and azimuth when reflection-point data derived from different offsets and azimuths are stacked, the data are smeared.

The most direct method of overcoming reflection-point smear is to perform migration before stack. That technique converts non-zero offset data directly to the final migrated image without any restriction on dip, offset or azimuth. Full migration before stack is, however, a very costly process computationally because, for a 3-D survey, as many as 2 to 10 million traces, each including 1500 to 2000 samples, must be individually processed. Furthermore, the migration velocity field must be known with considerable accuracy before pre-stack migration is possible. That requirement involves additional expensive velocity analyses. It is evident therefore that the data-compression capability offered by stacking before migration is highly desirable.

An attractive alternative to full migration before stack in 2-D is the use of Pre-stack Partial Migration, also known as Dip Moveout Correction (DMO). That process attempts the relatively modest task of converting finite-offset data that have had a conventional normal moveout correction (NMO) applied using migration velocities, to true zero offset. DMO removes the effect of reflection-point smear and enables events to be stacked coherently regardless of dip or azimuth. Thereafter the data can be stacked and migrated conventionally but with a substantial degree of data compression. An additional advantage is that DMO is a relatively small correction that tends to be insensitive to errors in the estimated velocity used for NMO correction.

Hale proposed a DMO algorithm for 2-D data reduction in his Doctoral thesis "Dip Movement by Fourier Transform", submitted to the Department of Geophysics, Stanford University, May, 1983. On pages 67–71, he proposes to extend his 2-D analysis from 2-D to 3-D but fails to arrive at a computationally practical analytical solution.

A major disadvantage of the Hale transform in 3-D is that it cannot be directly reformulated as a fourier transform. His method requires the equivalent computational effort of a discrete transform rather than a Fast Fourier Transform. In his process, the amount of computation is the same for all offsets (except zero offset) and for all travel times, whereas it is known that the DMO operator has little effect for small offsets and increasing travel times. The Hale transform cannot exploit that property.

An intractable problem in 3-D DMO processing is that the source-receiver offset is a vector rather than a scaler quantity as it is in 2-D. Furthermore, the data are smeared over an ellipsoidal surface instead of along a line. In a typical 3-D survey where the magnitudes of the offsets and azimuths may vary drastically, the number of separate offsets that must be processed using conventional approaches may approach the number of traces in the survey.

SUMMARY OF THE INVENTION

It is the purpose of this invention to provide an efficient and computationally-economical computer-aided implementation of a method for converting a set of aerially-distributed seismic field traces into a new, clearly-resolved three-dimensional volume of seismic traces representative of the earth in the presence of dipping layers along offsets having varying azimuths.

In accordance with an aspect of this invention, a plurality of seismic traces are generated at a plurality of seismic signal receivers that are isonified by a plurality of seismic sources arranged in areal arrays in a region to be surveyed. A line is established between a selected source and a receiver, along which line there are defined a plurality of cells, $m_i$. The seismic trace derived from the selected receiver is normal-moveout corrected and weighted in inverse proportion to the offset between a midpoint $m_o$ and the respective cell $m_i$ and proportional to the square root of the seismic trace time to create a set of weighted traces. The traces are altered by applying a moveout coefficient. After alteration of the traces, the frequency content of each trace is limited to avoid aliasing artifacts. The altered and frequency-limited traces are stacked into the corresponding cells $m_i$. The process is repeated for all source-receiver locations of interest. The stacked traces from all cells may be displayed as a zero-offset, unmigrated three-dimensional structural representation of a volume of the earth.

BRIEF DESCRIPTION OF THE DRAWINGS

The objects and methods of this invention will be better understood by reference to the drawings wherein.

DETAILED DESCRIPTION ON AN EMBODIMENT OF THE INVENTION

It is presumed that one skilled in the art is sufficiently familiar with the U.S. Pat. Nos. 3,217,828 and 2,732,906 and other references previously cited so that a detailed discussion of conventional CMP-profiling is unnecessary here.

Figure 1:
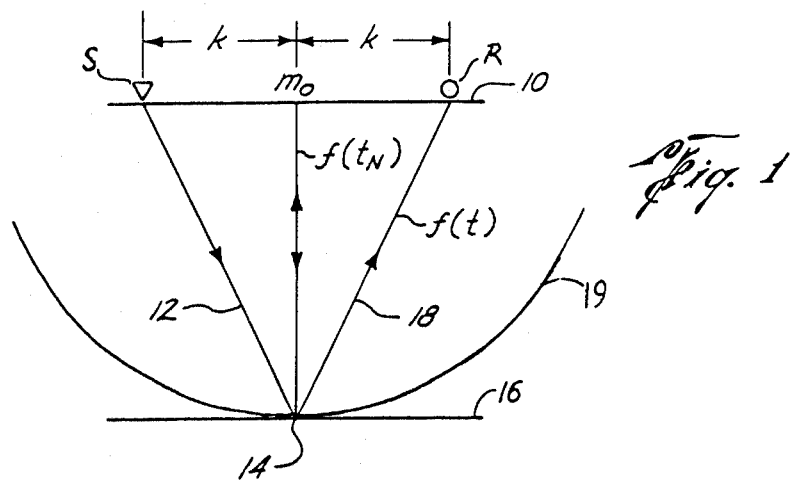
FIG. 1 defines the ray paths associated with an acoustic source and a receiver in the presence of a non-dipping earth layer.

The next several paragraphs are primarily tutorial in nature. With reference now to FIG. 1, certain quantities to be discussed later will be defined. A portion of the surface of the earth is shown at 10. A sound source S may be offset from a receiver R by an offset distance 2k with a midpoint at $m_o$. A wavefield generated at S, may travel along ray path 12 to a reflecting point 14 on reflector 16 and reflected back along ray path 18 to receiver R. The amplitude of the wave field as a function of time, f(t), may be recorded on a time-scale recording, hereinafter referred to as trace. Seismic data are generally quantized as digital samples. In the processes next to be discussed, each sample of a seismic trace may be operated upon individually. In the interest of brevity, use of the collective term "seismic trace" in conjunction with a process means that every data sample of that trace has been individually subjected to the named process.

Because of the offset distance 2k, the arrival time t of a particular wavelet along path S-14-R is greater than the travel time $t_n$ of a wavelet that might have traveled along a direct path $m_o$-14-$m_o$. The time difference is termed normal moveout (NMO). The quantity f(t) may be corrected for NMO by the relation $$t_n^2 = t_t - (4k^2/V^2) \tag{1}$$

where V represents the root mean squared (RMS) velocity of the medium through which the wavelet traveled. The above relation is accurate for reflector-dip components of about ten degrees or less. It should be observed that for trivial dips and zero offset the reflection points for $f(t_n)$ such as 14 lie along a semicircle such as 19 centered about $m_o$. Wavelet amplitude varies according to the inverse square law due to geometric spreading.

Figure 2:
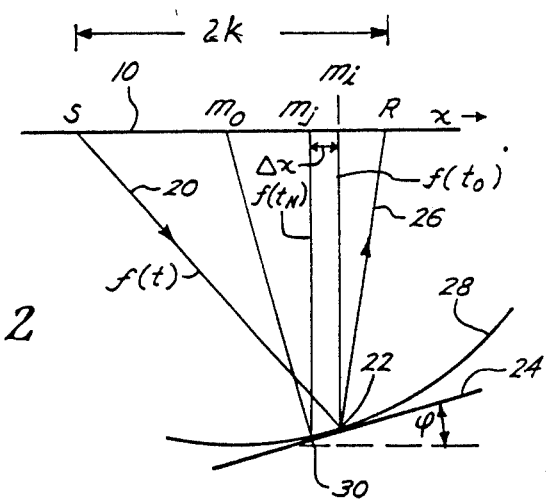
FIG. 2 shows the effects of a reflection-point smear in the presence of a dipping earth layer.

In the presence of substantial dip, the simple formulation of Equation (1) is no longer valid. Referring now to FIG. 2, a wavelet may propagate from S along ray path 20 to reflecting point 22 on dipping reflector 24 and thence to R along path 26, R being offset from S by distance 2k. The reflecting points for a finite offset would no longer die along a semicircle, as for zero-offset travel paths; they lie along an ellipse 28 having foci at S and R. Thus, for the finite-offset ray path, the true reflecting point 22 lies up dip from the zero-offset reflecting point 30. The finite-offset travel time corrected for NMO results in $f(t_n)$ at point 30, projected along a perpendicular to $m_j$, which is actually the unmigrated depth point for a zero-offset travel path. The true migrated depth point $f(t_o)$ at 22 lies beneath $m_i$ which is separated from $m_j$ by the distance $\Delta x \sec \phi$. Accordingly, if one attempts to stack trace samples having the same midpoint but different offsets, the data are smeared. If one had prior knowledge of the local dip, one could apply NMO using a dip-dependent velocity but for reasons to be explained that adjustment is usually not possible and even it were possible, it is correct only for that single dip.

Our introductory remarks pertained to two-dimensional geometry along a plane parallel to the direction of our dip. Our concern, however, is to image a three-dimensional volume of the earth.

Figure 3:
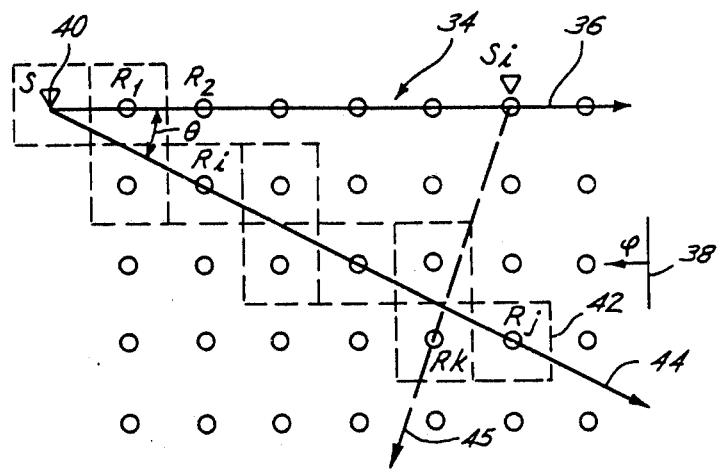
FIG. 3 illustrates an example of a source-receiver seismic array.

FIG. 3 is a plan view of an array 34 of receivers (represented by circles) arranged in one of many desired patterns at or near the surface of the earth. The array is adaptable to many land or marine operations.

For the purposes of this discussion only, the direction of progress along a line of profile is assumed to be from west to east such as along line 36, parallel to the direction of maximum dip as shown by the dip-strike symbol 38, having dip angle $\phi$. A source S, at the initial position shown by the inverted triangle 40, is fired to generate seismic time-scale traces for every receiver in the array within range of source S. The source is then moved to a new position such as receiver position $R_1$, where the source is again fired. The survey proceeds as the source is moved along line of profile 36, thence back and forth along each tier of receivers. Tie lines may be surveyed along the north-south direction as desired. Each time a source is fired, a new seismic trace is generated for each receiver of the array. The set of data received by each receiver may be assigned to a cell such as 42 associated with the receivers. For later data processing, the respective cells may correspond to suitable locations in a computer memory or disk storage wherein the seismic traces may be stored in the form of digital samples.

Along any given line such as 36, a 2-D picture of a slice of the earth may be generated as described for FIG. 2. Incident ray points for non-zero offsets lie along an ellipse. For any line 44 lying at an arbitrary angle (azimuth) to the direction of maximum dip in a 3-D array, the incident ray points lie on the surface of an ellipsoid whose major axis is aligned along azimuth angle $\theta$. Scaler quantities in a 2-D projection become vectors in 3-D. Levin, previously cited, shows that the ratio between a dip-dependent velocity $V_d$ and the medium velocity V is given by the expression $$V_d/V = -\sqrt{(1 - \sin^2\phi\cos^2\theta)} \ . \tag{2}$$

For large dips and small azimuths, the ratio becomes very large. Thus, for 3-D processing, the stacking velocity is both dip-dependent and azimuth-dependent. We usually do not know the value of the local dip and strike although we may have knowledge of the regional dip of the area taken as a whole. Therefore, we do not know the correct stacking velocity. It is the purpose of this invention to provide a data processing method that is independent of dip and azimuth and thus reduce dependency on an accurate knowledge of the velocity function.

Figure 4:
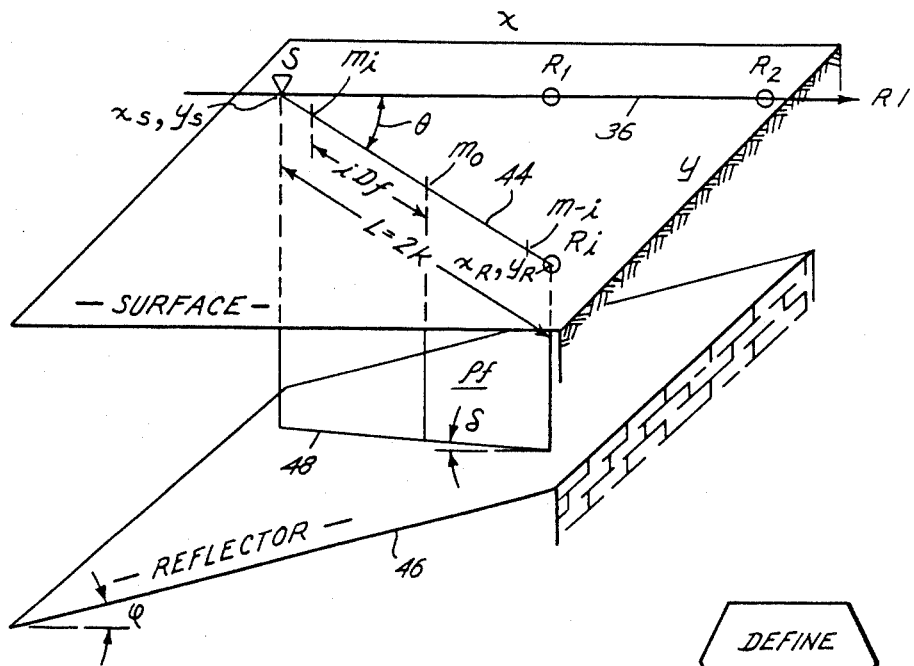
FIG. 4 is an isometric view of a volume of the earth to illustrate of the significance of various symbolic quantities.

Refer now to FIG. 4. There is shown the surface of the earth in x, y coordinates. FIG. 4 is an expanded isometric view of that portion of array 34 that includes S, $R_1$, $R_2$, and $R_i$. Line 44 makes an azimuth angle of $\theta$ with respect to the direction of maximum dip. A portion of reflecting interface 46 is shown beneath the surface with a dip of $\theta$ as in FIGS. 2 and 3. Below line segment 48 projected vertically below line 44, reflector 46 has a dip component $\delta$.

Source S, having coordinates ($x_S$, $y_S$) is offset from receiver $R_i$, having coordinates ($x_R$, $y_R$), by a distance L=2K and having a midpoint $m_o$. Source S generates a wave field f(t) that is reflected from dipping interface 46 and received by receiver $R_i$. We now define a plane $\rho f$ along line 44, perpendicular to the surface and having end coordinates ($x_S$, $y_S$), ($x_R$, $y_R$). We now chose a distance iDf and define points $m_i$ on line 44 such that $$d(m_o, m_i)=d(m_o, m_{-1})=iDf \tag{3}$$

A plurality of points $m_i$ may be generated such that the running index i lies within the limits $-n$ which is less than or equal to i which is less than or equal to n, and nDf is less than or equal to k. The legends $m_i$ designate the centers of cells such as 42 of FIG. 3, or smaller subdivisions of such cells. The dimensions of the cells depend upon the resolution available from the 3-D array and that desired for the final 3-D display of data.

As a first step, we apply NMO to f(t) to find $f(t_n)$. For this step, the NMO correction is based upon the RMS medium velocity. The next step is to define a quantity $C_i$ for each i greater than or equal to $-n$, but less than or equal to n, such that $$C_i = \sqrt{[1 - (iDf/k)^2]} \ . \tag{4}$$

Next, compute an amplitude weight coefficient $w_i$, where $$w_i(iDf, t_n, 2k) = \tag{5}$$
$$Df/[(1 + 4k(2s - s^2)) \times \sqrt{[(1 - (iDf)^2/(k^2))^3]}]$$

where s is equal to $t_n(2/F)$, and F is the dominant frequency.

The weight function is asymptotically correct as offset and time approach either zero or infinity. It shows similar behavior to the weight function (w) disclosed in U.S. Pat. No. 4,742,497 mentioned above in the region in which w was acceptable. Analytical results predict good agreement with the f-k DMO operator for all values of time, offset, and trace spacing. Experimental results confirm this.

Next, the weighted traces $f_w(t_n)$ are equal by definition to $w_i(t_n)$ are altered at the respective $m_i$ by applying a moveout coefficient $C_i$ which is a function of the ratio between $m_o$ and the respective $m_i$, and one-half the offset distance (k), according to the expression:

$$t_o=C_i\times t_n \tag{6}$$

and stack the result in the seismic traces contained in the cells centered at each of the $m_i$ in the plane $\rho f$. The stacked (summed) quantity corresponds to a zero-offset experiment in three-dimensional space.

The characteristics of the moveout coefficient $C_i$ are of interest. When iDf is zero, that is when $m_i=m_o$, $C_i$ is unity and $f(t_o)=f(t_n)$, the NMO-corrected two-way travel time from $m_o$, migrated to $m_j$. When iDf approaches k, C approaches zero and $f(t_o)$ approaches zero. That result is of course implausible. Accordingly, as iDf approaches k, the end times of the reflection incident-point ellipse are modified such that the time gradient is limited in proportion to the expression:

$$dt/d\chi < 2 \sin\phi/V(t_n) \tag{7}$$

where $\phi$ is the maximum geologic dip that may be assumed to exist in the survey area, and x is the distance between adjacent $m_i$.

After the dip moveout (DMO) is applied to the NMO corrected trace according to Equation 6 to generate the DMO corrected component trace, the local frequency content of the trace should be limited to avoid aliasing artifacts. The maximum allowable frequency is preferably determined by the expression:

$$f_{max}(t_o, iDf, Df) = (k^2 - (iDf)^2)/(2iDf \times Df \times t_o) \qquad (8)$$

where Df is the cell spacing along the source to receiver line $S-m_o-R$.

Figure 5:
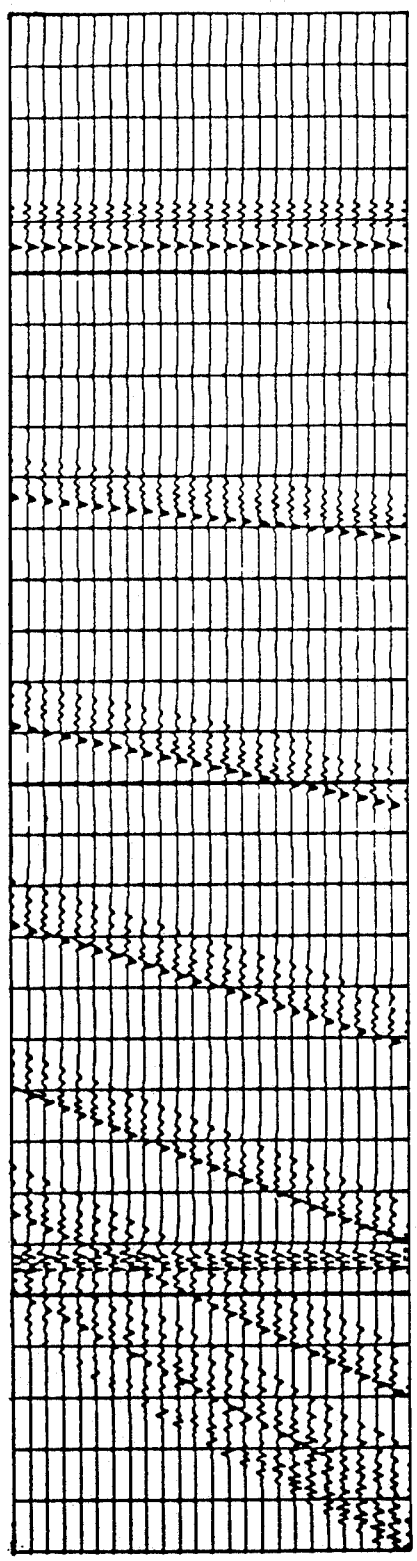
FIG. 5 shows a series of flat synthetic reflections with dipping seismic events.
Figure 6:
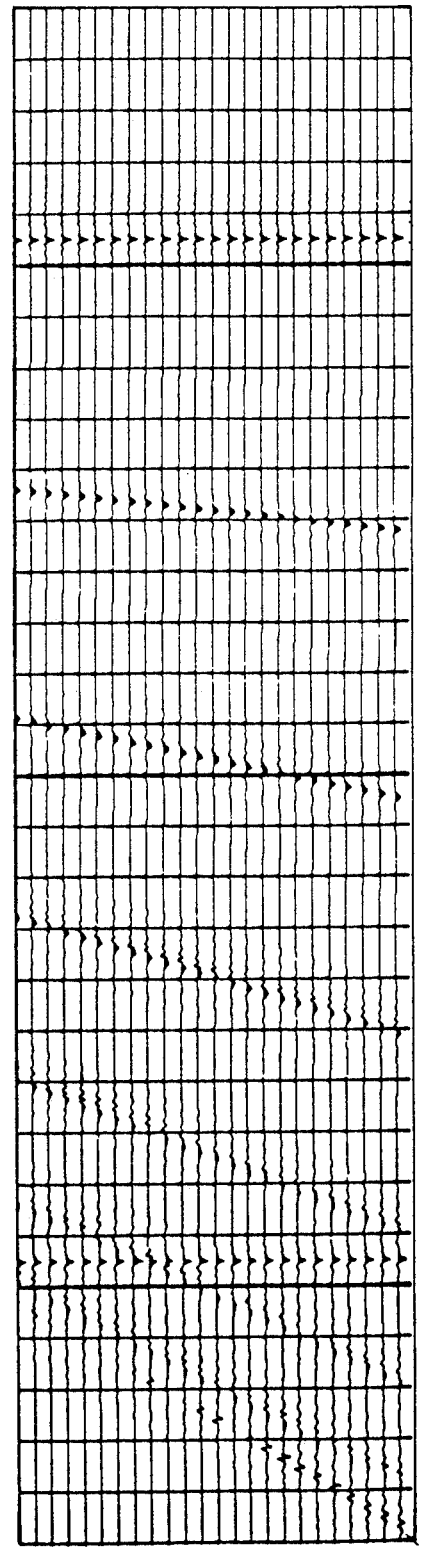
FIG. 6 shows the same series of synthetic reflections shown in FIG. 5 after application of an anti-aliasing algorithm.

Refer to FIG. 5 which illustrates a synthetic seismic section. The beneficial effects of the anti-alias feature are demonstrated by a series of flat reflection events 50 with dipping events 52 crossing. This is a common offset section to which conventional DMO has been applied. Note that the flat and dipping events 50 and 52 are not zero phase, showing significant precursors 54 ahead of the wavelet 56. FIG. 6 shows the same synthetic section after using the anti-alias algorithm described above. The precursors 54 have been substantially collapsed and are barely discernable, giving a consistent zero-phase wavelet 56.

For purposes of explanation, the example of FIG. 4 was confined to a line segment 44 extending from S to $R_i$. But the processing may not be confined to that short line segment; it may be extended from S to $R_j$ and beyond as shown in FIG. 3.

In addition, other source-receiver pairs may be chosen such as from a source $S_i$ through a receiver $R_k$ along the dashed line 45 in FIG. 3. Some of the cells $m_i$ along $S_i$-$R_k$ would be coincident with other cells $m_j$ along line S-$R_j$. Seismic traces common to any one cell, regardless of the source-receiver locations would be stacked together because they represent the same subsurface reflection point. In an actual field survey, there may be as many source locations as there are receiver locations. The process outlined above is carried out for every source-receiver combination of interest in the area of survey. Usually the final stacked values in the respective cells are normalized to compensate for the variable number of traces summed.

The stacked seismic traces in each cell may be displayed either as a three-dimensional volume of the earth in the form of, for example, an isometric cube, or the data may be displayed as sets of two-dimensional panels at the option of the user, using conventional processing technique.

Advantageously, the procedure avoids the use of dip-dependent and azimuth-dependent velocities. The only velocity involved is a best estimate of the RMS medium velocity used to compute the NMO.

Figure 7:
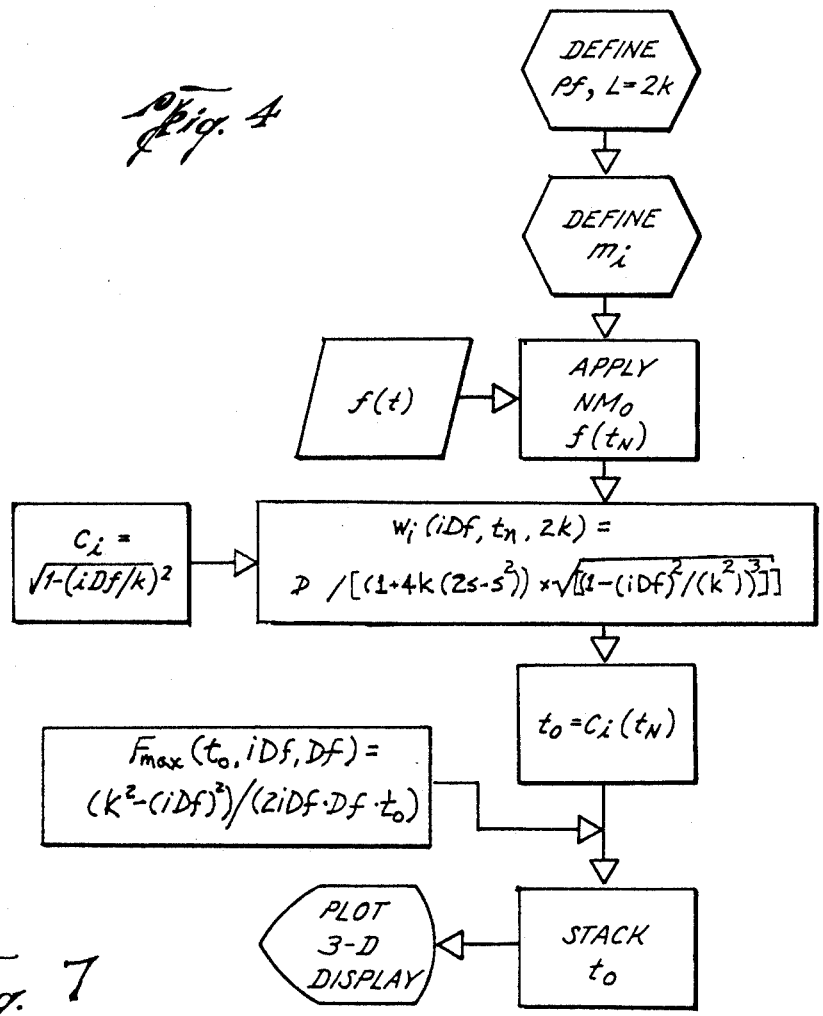
FIG. 7 is a flow diagram of a computer implementation of the process of this invention.

Because of the massive number of calculations needed, the process is preferably computer implemented in accordance with the flow diagram of FIG. 7.

This invention has been written with a certain degree of specificity by way of example only. Other procedures and techniques may occur to those skilled in the art but which remain within the scope of this disclosure which is limited only by the appended claims.

I claim as my invention:

1. A method for stacking three dimensional seismic data to form a seismic section, the data consisting of a plurality of traces corresponding to individual source-to-receiver pairs stacked into a plurality of cells geometrically defined on a representation of the surface of the earth and in which stacking is based upon a selected root-mean-squared velocity, comprising the steps of:
    (a) normal-moveout correcting each trace prior to stacking based on the source-to-receiver distance for each trace;
    (b) weighting each normal-moveout corrected trace to compensate for geometric spreading between the source-to-receiver pairs according to the expression:

$$w_i(iDf, t_n, 2k) = Df/[(1 + 4k(2s - s^2)) \times \sqrt{[(1 - (iDf)^2/(k^2))^3]}\,]$$

where:
$w_i$ an amplitude weighting coefficient;
iDf is one half the dimension of the cell;
$t_n$ is a normal moveout corrected time;
k is one-half the offset distance;
Df is the cell spacing between said plurality of cells along a line including the source-to-receiver pairs;
s is equal to $t_n(2/F)$; and
F is equal to the dominant frequency; and
    (c) altering the resultant normal-moveout corrected and weighted traces by a moveout coefficient which is a function of a relative distance between said plurality of cells into which each trace is to be stacked and the midpoint between the source and receiver corresponding to that trace, the altering of the traces made according to the expressions:

$$t_o = C_i \times t_n; \text{ and}$$

$$C_i = \sqrt{(1 - (iDf/K)^2)}\ ;$$

where: $t_o$ is the altered travel time seismic signal; and
    (d) limiting local frequency content of each normal-moveout corrected trace to avoid aliasing artifacts in the stacked seismic data according to the expression:

$$F_{max}(t_o, iDf, Df) = (k^2 - (iDf)^2)/(2iDf \times Df \times t_o),$$

where $F_{max}$ is the maximum allowable frequency.

2. The method as defined by claim 1, further including the step of defining a time gradient between adjacent cells in proportion to a maximum expected geologic dip.

3. In a method for stacking three-dimensional seismic data, the data consisting of a plurality of traces corresponding to individual source to receiver pairs and having a predetermined frequency range, into a plurality of cells geometrically defined on a representation of the earth's surface and in which stacking is based on a selected root-mean-squared velocity, the improvement comprising:
    (a) prior to stacking the traces, normal-moveout correcting each trace based on the shot-to-receiver distance for each trace;
    (b) weighting each normal-moveout corrected trace to compensate for geometric spreading between the source to receiver pairs;
    (c) altering the resulted normal-moveout corrected and weighted traces by a movement coefficient that is a function of a relative distance between the cell into which each trace is to be stacked and the midpoint between the source and receiver corresponding to that trace; and (d) limiting the frequency content of each trace to avoid aliasing artifacts according to the expression:

$$F_{max}(t_o, iDf, Df) = (k^2 - (iDf)^2/(2iDf \times Df \times t_o)$$

where $F_{max}$ is the maximum allowable frequency;

$t_o$ is the altered travel time seismic signal;

iDf is one-half the dimension of the cell;

Df is the cell spacing between the source to receiver pairs; and k is one half the offset distance.

4. The method as defined by claim 3, further including the step of defining a time gradient between adjacent cells in proportion to a maximum expected geologic dip.

* * * * *